(12) United States Patent
Sargazikoosheh et al.

(10) Patent No.: US 11,008,085 B2
(45) Date of Patent: May 18, 2021

(54) TROLLING MOTOR STEERING ASSEMBLY WITH STALL PREVENTION

(71) Applicant: NAVICO HOLDING AS, Egersund (NO)

(72) Inventors: Masoud Sargazikoosheh, Albany (NZ); Tore Høyland, Sirevåg (NO)

(73) Assignee: NAVICO HOLDING AS, Egersund (NO)

( * ) Notice: Subject to any disclaimer, the term of this patent is extended or adjusted under 35 U.S.C. 154(b) by 1 day.

(21) Appl. No.: 16/524,564

(22) Filed: Jul. 29, 2019

(65) Prior Publication Data
US 2021/0031894 A1 Feb. 4, 2021

(51) Int. Cl.
*B63H 20/00* (2006.01)
*B63H 25/52* (2006.01)
*H02P 8/32* (2006.01)

(52) U.S. Cl.
CPC ......... *B63H 21/265* (2013.01); *B63H 20/007* (2013.01); *B63H 25/52* (2013.01); *H02P 8/32* (2013.01)

(58) Field of Classification Search
CPC .... B63H 21/265; B63H 25/52; B63H 20/007; H02P 8/32
USPC ........................................................ 440/1, 7
See application file for complete search history.

(56) References Cited

U.S. PATENT DOCUMENTS

| 3,424,961 A | 1/1969 | Leenhouts |
| 5,386,368 A * | 1/1995 | Knight ................ B63H 25/42 114/144 A |
| 6,054,831 A | 4/2000 | Moore et al. |
| 6,325,685 B1 * | 12/2001 | Knight ................ B63H 20/007 440/7 |
| 6,447,347 B1 | 9/2002 | Steinhauser |

(Continued)

FOREIGN PATENT DOCUMENTS

| EP | 1 891 461 B1 | 5/2014 |
| WO | WO 95/28682 | 10/1995 |

(Continued)

OTHER PUBLICATIONS

"https://www.businesswire.com/news/home/20170418006703/en/Toshibas-New-Stepping-Motor-Driver-IC-Anti-Stall" Businesswire, Apr. 19, 2017 (Year: 2017).*

(Continued)

*Primary Examiner* — Anthony D Wiest
(74) *Attorney, Agent, or Firm* — Nelson Mullins Riley & Scarbourogh LLP

(57) ABSTRACT

A trolling motor assembly is provided for attachment to a watercraft. The trolling motor assembly includes a steering assembly having a stepper motor with motor current feedback to prevent stall of the stepper motor during steering of the trolling motor. The stepper motor, which rotates the shaft to which the primary trolling motor is coupled to change the direction of thrust in accordance with a steering command, is dynamically controlled utilizing motor current feedback to change the speed of the stepper motor to adapt to the load conditions on the steering assembly. The feedback control can enable operation of the stepper motor at increased RPMs under relatively low load conditions, while preventing stalls by adjusting the drive signal to decrease the speed of the stepper motor in response to increased loads.

20 Claims, 8 Drawing Sheets

(56) References Cited

U.S. PATENT DOCUMENTS

| | | |
|---|---|---|
| 6,507,164 B1 | 1/2003 | Healey et al. |
| 6,524,144 B2 | 2/2003 | Pasley |
| 6,661,742 B2 | 12/2003 | Hansen |
| 6,678,589 B2 | 1/2004 | Robertson et al. |
| 6,759,822 B2 * | 7/2004 | Marusarz .............. H02P 7/0094 318/268 |
| 6,870,794 B2 | 3/2005 | Healey |
| 6,902,446 B1 | 6/2005 | Healey |
| 6,919,704 B1 | 7/2005 | Healey |
| 7,004,804 B2 | 2/2006 | Bernloehr et al. |
| 7,195,526 B2 | 3/2007 | Bernloehr et al. |
| 7,303,595 B1 | 12/2007 | Janitz |
| 7,538,511 B2 | 5/2009 | Samek |
| D594,034 S | 6/2009 | Bernloehr et al. |
| 7,722,417 B2 | 5/2010 | Bernloehr et al. |
| 8,106,617 B1 | 1/2012 | Holley |
| 8,305,844 B2 | 11/2012 | DePasqua |
| 8,645,012 B2 | 2/2014 | Salmon et al. |
| 8,761,976 B2 | 6/2014 | Salmon et al. |
| 8,814,129 B2 | 8/2014 | Todd et al. |
| 8,879,359 B2 | 11/2014 | DePasqua |
| 9,127,707 B1 | 9/2015 | Huntley |
| 9,132,900 B2 | 9/2015 | Salmon et al. |
| 9,160,210 B2 | 10/2015 | Perry |
| 9,162,743 B2 | 10/2015 | Grace et al. |
| 9,278,745 B2 | 3/2016 | Kooi, Jr. et al. |
| 9,290,256 B1 | 3/2016 | Wireman et al. |
| 9,296,455 B2 | 3/2016 | Bernloehr et al. |
| 9,676,462 B2 | 6/2017 | Bernloehr et al. |
| 9,994,296 B1 * | 6/2018 | Balogh ................ B63H 21/213 |
| 2002/0102888 A1 | 8/2002 | Pasley |
| 2003/0191562 A1 | 10/2003 | Robertson et al. |
| 2003/0203684 A1 | 10/2003 | Healey |
| 2005/0257761 A1 | 11/2005 | Hayase et al. |
| 2006/0116031 A1 | 6/2006 | Bernloehr et al. |
| 2009/0037040 A1 | 2/2009 | Salmon et al. |
| 2009/0227158 A1 | 9/2009 | Bernloehr et al. |
| 2010/0116967 A1 | 5/2010 | Todd et al. |
| 2012/0014220 A1 | 1/2012 | DePasqua |
| 2012/0015566 A1 | 1/2012 | Salmon |
| 2012/0204467 A1 | 8/2012 | Palmer et al. |
| 2012/0232719 A1 | 9/2012 | Salmon et al. |
| 2013/0044569 A1 | 2/2013 | DePasqua |
| 2013/0215719 A1 | 8/2013 | Betts et al. |
| 2014/0203162 A1 | 7/2014 | Logan |
| 2014/0249698 A1 | 9/2014 | Salmon et al. |
| 2014/0269164 A1 | 9/2014 | Betts et al. |
| 2014/0277851 A1 | 9/2014 | Grace et al. |
| 2014/0336854 A1 | 11/2014 | Salmon et al. |
| 2015/0016130 A1 | 1/2015 | Davis et al. |
| 2015/0063059 A1 | 3/2015 | DePasqua |
| 2015/0063060 A1 | 3/2015 | DePasqua |
| 2015/0151824 A1 | 6/2015 | Wireman |
| 2015/0346729 A1 | 12/2015 | Grace et al. |
| 2016/0016651 A1 | 1/2016 | Anderson et al. |
| 2019/0176952 A1 | 6/2019 | Clark et al. |

FOREIGN PATENT DOCUMENTS

| | | |
|---|---|---|
| WO | WO 2013/126761 A1 | 8/2013 |
| WO | WO 2014/144471 A1 | 9/2014 |

OTHER PUBLICATIONS

Minn Kota Ultrex Trolling Motor (5 pgs.) Website visited Feb. 20, 2019 https://minnkotamotors.johnsonoutdoors.com/freshwater-trolling-motors/ultrex.

MotorGuide® Product Guide—The Digital Advantage (48 pgs.) Downloaded Feb. 22, 2019 http://www.motorguide.com/userfiles/file/catalog/2004.pdf.

U.S. Appl. No. 16/290,015, filed Mar. 1, 2019, entitled "Trolling Motor System with Damage Prevention Feedback Mechanism and Associated Methods".

U.S. Appl. No. 16/208,944, filed Dec. 4, 2018, entitled "Foot Pedal for a Trolling Motor Assembly".

TMC246/B Data Sheet; *Trinamic Motion Control*; V2.10; Jun. 6, 2016; 28 pp.; retrieved Jul. 30, 2019 from https://www.trinamic.com/fileadmin/assets/Products/ICs_Documents/TMC246_datasheet.pdf.

TMC249; *Trinamic—Integrated Circuits*; retrieved Jul. 30, 2019 from https://www.trinamic.com/products/integrated-circuits/details/tmc249/.

DRV8711 Data Sheet; Stepper Motor Gate Driver with On-Chip 1/256 Micro-Stepping Indexer and Stall Detect; *Texas Instruments*; retrieved Jul. 30, 2019 from http://www.ti.com/product/DRV8711.

L6470; Fully Integrated Microstepping Motor Driver with Motion Engine and SPI; ST; Mar. 2015; 73 pp.; retrieved Jul. 30, 2019 from https://www.st.com/resource/en/datasheet/16470.pdf.

L9942; Integrated Stepper Motor Driver for Bipolar Stepper Motors with Microstepping and Programmable Current Profile; ST; Sep. 2013; 40 pp.; retrieved Jul. 30, 2019 from https://www.st.com/resource/en/datasheet/19942.pdf.

AMIS-30623; Micro-stepping Motor Driver; *ON Semiconductor*; May 2009; Rev. 7; 61 pp.; retrieved Jul. 30, 20919 from https://www.onsemi.com/pub/Collateral/AMIS-30623-D.PDF.

A4979: Microstepping Programmable Stepper Motor Driver with Stall Detect and Short Circuit Protection; *Allegro Microsystems, LLC*; retrieved Jul. 30, 2019 from https://www.allegromicro.com/en/Products/Motor-Drivers/Brush-DC-Motor-Drivers/A4979.

* cited by examiner

TROLLING MOTOR STEERING ASSEMBLY WITH STALL PREVENTION

FIELD OF THE INVENTION

Embodiments of the present invention relate generally to trolling motor assemblies and, more particularly, to systems, assemblies, and associated methods for providing a trolling motor steering assembly having a stepper motor with motor current feedback to prevent stall of the stepper motor during steering of the trolling motor.

BACKGROUND OF THE INVENTION

Trolling motor assemblies are often used during fishing or other marine activities. The trolling motor assembly attaches to the watercraft and propels the watercraft along a body of water. While trolling motor assemblies may be utilized as the main propulsion system of watercraft, trolling motor assemblies are often utilized to provide secondary propulsion or precision maneuvering that can be ideal for fishing activities. Typically, trolling motor assemblies include a small gas or electric trolling motor for providing thrust and a steering mechanism for changing the direction of the generated thrust. Known steering mechanisms for the trolling motor include mechanical steering (e.g., via a tiller handle, cables coupled to a foot pedal, etc.) and electronic steering having a secondary motor such that can be controlled remotely (e.g., via a wired foot pedal or wireless remote control) to change the direction of the trolling motor thrust. Because the audio noise associated with the operation of trolling motor assemblies can be an important consideration, such as to avoid frightening nearby fish, advancements have been made in reducing the noise generated by the electric trolling motor itself. However, there remains a need for improved electronic steering mechanisms for precisely and quietly changing the direction of the trolling motor thrust.

BRIEF SUMMARY OF THE INVENTION

As noted above, electronically-controlled trolling motor assemblies generally include a small trolling motor that provides the thrust, while a secondary, electric steering motor is utilized to rotate the trolling motor to various angular positions so as to precisely control the propulsion direction. Though electric stepper motors generally provide precise positional control under known, stable load conditions, their use as part of an electronically-controlled steering mechanism for trolling motor assemblies remains limited due to issues associated with the dynamic, variable load conditions to which the steering assembly is subjected while rotating the trolling motor (e.g., the trolling motor housing running into rocks, dirt, clay, etc., being tangled in seaweed, or other possible load scenarios). It has been found, for example, that audio noise generated by a stepper motor operating at low revolutions-per-minute (RPMs) may spook nearby fish and/or create an unpleasant boating experience, while stepper motors operating at higher RPMs under increasing loads exhibit an increased risk of stall (and its associated noise rattling and potential steering motor damage), the recovery from which may also be slow and unacceptably noisy.

Applicant has developed systems, assemblies, and methods detailed herein to improve features and capabilities of electronic trolling motor steering assemblies. In some example embodiments of the present invention, a steering stepper motor, which rotates a shaft to which the primary trolling motor is coupled to change the direction of thrust in accordance with a steering command, is dynamically controlled utilizing motor current feedback to change the speed of the stepper motor to adapt to the load conditions on the steering assembly. In various aspects, this dynamic feedback control can more efficiently (and more quietly) operate the steering assembly by providing for increased RPMs of the stepper motor under relatively low load conditions, while preventing stalls by decreasing the speed of the stepper motor in response to increased loads as detected by an increase in the electric current supplied to the stepper motor as the trolling motor is driven to its desired orientation. In some aspects, as the load on the steering assembly is reduced or overcome (e.g., as indicated by a decrease in the electric current supplied to the stepper motor operating at a given RPM), the feedback control can enable the speed of the stepper motor to again increase to a higher RPM.

In some example embodiments of the present invention, a trolling motor steering assembly is provided, the trolling motor steering assembly comprising a stepper motor configured to be coupled to a trolling motor for steering thereof and a steering assembly control system for controlling the stepper motor. In response to one or more steering commands, the steering assembly control system can determine a stepper motor driver setting to effectuate the steering command(s). For example, based on the steering command(s), the stepper motor driver setting can comprise an amount and direction of rotations (e.g., clockwise, counterclockwise) of the stepper motor's rotor to effectuate the desired angular orientation of the trolling motor and/or a target speed of the stepper motor's rotation to achieve the desired orientation. A drive signal in accordance with the stepper motor driver setting is then applied to the stepper motor so as to cause the steering assembly to obtain the desired orientation of the trolling motor. As the drive signal is applied to the stepper motor (e.g., while the trolling motor is being rotated toward its desired orientation), a feedback signal indicative of the electric current supplied to the stepper motor is utilized to adjust the drive signal so as to prevent stall of the stepper motor. For example, while relatively high speeds (RPMs) may be preferred under no-load or low-load conditions in order to reduce noise and more quickly attain the desired orientation of the trolling motor, the stepper motor may stall if the load on the stepper motor exceeds the motor's torque-speed curve. Accordingly, if an increase of the current supplied to the stepper motor indicates that the stepper motor is at or approaching a stall condition, the drive signal can be adjusted to reduce the RPM of the stepper motor in order to avoid stalling, for example, until the desired orientation is achieved and/or until the load is overcome.

In some example embodiments, a trolling motor steering assembly is provided, the trolling motor steering assembly comprising a stepper motor configured to be coupled to a trolling motor assembly and to rotate a shaft of the trolling motor assembly to a plurality of positions about an axis. The trolling motor steering assembly may also include a steering assembly control system, the steering assembly control system comprising a processor, current sensor circuitry for generating a signal indicative of the electric current supplied to the stepper motor, and a memory including program code configured to, when executed, cause the processor to: receive a steering command; determine a stepper motor driver setting based on the steering command, wherein the stepper motor driver setting comprises a first target speed of the stepper motor; apply a first drive signal to operate the stepper motor at the first target speed in accordance with the stepper motor driver setting so as to cause the steering assembly to rotate the trolling motor housing about the first axis in response to the steering command; receive the signal indicative of the electric current supplied to the stepper motor during the application of the first drive signal; and provide a second drive signal to operate the stepper motor at a second target speed that is less than the first target speed in an instance in which the signal indicative of the electric current supplied to the stepper motor during the application of the first drive signal corresponds to an operating condition associated with an increased likelihood of stall.

An example embodiment of the present invention includes a trolling motor assembly configured for attachment to a watercraft. The trolling motor assembly comprises a shaft defining a first end and a second end and a trolling motor at least partially contained within a trolling motor housing, wherein the trolling motor housing is attached to the second end of the shaft. When the trolling motor assembly is attached to the watercraft and the trolling motor housing is submerged in a body of water, the trolling motor, when operating, may be configured to propel the watercraft to travel along the body of water. In some aspects, the trolling motor assembly can further include a main housing connected to the shaft proximate the first end of the shaft such that the main housing is configured to be positioned out of the body of water when the trolling motor assembly is attached to the watercraft and the trolling motor housing is submerged in the body of water. The trolling motor assembly further includes a steering assembly comprising a stepper motor and configured to rotate the trolling motor housing about a first axis defined by the shaft to a plurality of positions, for example, based on one or more user-inputs of automatic steering commands. The trolling motor assembly further includes a steering assembly control system comprising a processor, current sensor circuitry for generating a signal indicative of the electric current supplied to the stepper motor, and a memory including program code configured to, when executed, cause the processor to receive the steering command(s) and determine a stepper motor driver setting based thereon. For example, in various aspects, the stepper motor driver setting may comprise a first target speed of the stepper motor to achieve the desired angular orientation of the trolling motor housing. The computer program code can further be programmed to cause the processor to apply a first drive signal to operate the stepper motor at the first target speed in accordance with the stepper motor driver setting so as to cause the steering assembly to rotate the trolling motor housing about the first axis in response to the steering command(s). During the application of the first drive signal, the processor may receive the signal indicative of the electric current supplied to the stepper motor and provide a second drive signal to operate the stepper motor at a second target speed that is less than the first target speed in an instance in which the signal indicative of the electric current supplied to the stepper motor during the application of the first drive signal corresponds to an operating condition associated with an increased likelihood of stall.

In some embodiments, the amplitude of the signal indicative of the electric current supplied to the stepper motor during the application of the first drive signal is positively correlated with the load on the stepper motor. For example, increasing the load on the stepper motor operating at a given RPM generally increases the current supplied to the stepper motor for a given supply voltage. In certain related aspects, the signal indicative of the electric current supplied to the stepper motor corresponds to the operating condition associated with an increased likelihood of stall in an instance in which the amplitude of the electric current supplied to the stepper motor is greater than a stall threshold at the first target speed of the stepper motor. Additionally or alternatively, the signal indicative of the electric current supplied to the stepper motor corresponds to the operating condition associated with an increased likelihood of stall in an instance in which a rate of change of an amplitude of the signal is greater than a stall rate of change threshold at the first target speed of the stepper motor. Such thresholds may represent a stall boundary that may, for example, be based on a relationship between the electric current supplied to the stepper motor and the stepper motor speed (RPM). In some aspects, the stall threshold can be pre-determined empirically or can be estimated for a particular steering motor assembly based on the size of the stepper motor, the size of the gear box, dynamic torque requirements, and/or the response time of full speed rotation, all by way of non-limiting example.

The drive signal applied to the stepper motor in accordance with the stepper motor driver setting generally energizes the stepper motor (e.g., via the application of a plurality of supply voltage pulses to the various poles of the stepper motor's stator) so as to cause incremental rotation of the stepper motor's rotor. The drive signal can comprise various waveforms of different amplitudes and timing. By way of example, the first drive signal may comprise a plurality of DC voltage pulses that each represents a discrete, incremental rotation of the stepper motor. In various aspects, the second drive signal may be provided by decreasing a frequency of the DC voltage pulses of the first drive signal and/or by increasing a pulse width of the DC voltage pulses of the first drive signal.

In some embodiments, the dynamic feedback can be further used to adjust the drive signal(s) based on continually changing load conditions. By way of example, the program code can be further configured to, when executed, cause the processor to provide a third drive signal to operate the stepper motor at a third target speed that is less than the second target speed in an instance in which the signal indicative of the electric current supplied to the stepper motor during the application of the second drive signal corresponds to the operating condition associated with an increased likelihood of stall at the second target speed of the stepper motor. Additionally or alternatively, the processor may provide a third drive signal to operate the stepper motor at a third speed that is greater than the second target speed in an instance in which the signal indicative of the electric current supplied to the stepper motor during the application of the second drive signal corresponds to a reduced load condition on the stepper motor, wherein the signal indicative of the electric current supplied to the stepper motor corresponds to the reduced load condition in an instance in which the amplitude of the electric current supplied to the stepper motor is less than a reduced load threshold during application of the second drive signal.

In some embodiments, the processor may provide a third drive signal to operate the stepper motor at a third target speed that is greater than the first target speed in an instance in which the signal indicative of the electric current supplied to the stepper motor during the application of the first drive signal corresponds to a reduced load condition on the stepper motor, wherein the signal indicative of the electric current supplied to the stepper motor corresponds to the reduced load condition in an instance in which the amplitude of the electric current supplied to the stepper motor is less than a reduced load threshold during application of the first drive signal.

As noted above, the steering assembly control system may comprise current sensor circuitry for generating a signal indicative of the electric current supplied to the stepper motor. In some embodiments, for example, the current sensor circuitry may be configured to generate a signal indicative of the average electric current supplied to the stepper motor.

In some embodiments, the stepper motor driver setting may further comprise a first target current at the first target speed, and wherein the program code may be further configured to, when executed, cause the processor to adjust a current profile to provide a second target current that is greater than the first target current at the first target RPM, while maintaining the first target speed, in an instance in which the signal indicative of the electric current supplied to the stepper motor during the application of the first drive signal corresponds to an operating condition associated with an increased likelihood of stall.

In another example embodiment, a method is provided. The method comprises receiving a steering command for a trolling motor assembly configured for attachment to a watercraft, wherein the trolling motor assembly comprises a shaft defining a first end and a second end and a trolling motor at least partially contained within a trolling motor housing attached to the second end of the shaft. The trolling motor assembly may be attached to the watercraft such that when the trolling motor housing is submerged in a body of water, the trolling motor, when operating, is configured to propel the watercraft to travel along the body of water. The trolling motor assembly may also include a main housing connected to the shaft proximate the first end of the shaft, wherein the main housing is configured to be positioned out of the body of water when the trolling motor assembly is attached to the watercraft and the trolling motor housing is submerged in the body of water. The trolling motor assembly further includes a steering assembly comprising a stepper motor, the steering assembly configured to rotate the trolling motor housing about a first axis defined by the shaft to a plurality of positions. In accordance with the example embodiment of the method, a stepper motor driver setting comprising a first target speed of the stepper motor may be determined based on the steering command, and a first drive signal may be applied to operate the stepper motor at the first target speed in accordance with the stepper motor driver setting so as to cause the steering assembly to rotate the trolling motor housing about the first axis in response to the steering command. During the application of the first drive signal, a signal indicative of the electric current supplied to the stepper motor may be received and a second drive signal may be applied to operate the stepper motor at a second target speed that is less than the first target speed in an instance in which the signal indicative of the electric current supplied to the stepper motor during the application of the first drive signal corresponds to an operating condition associated with an increased likelihood of stall.

In some embodiments, the method further comprises applying a third drive signal to operate the stepper motor at a third target speed that is less than the second target speed in an instance in which the signal indicative of the electric current supplied to the stepper motor during the application of the second drive signal corresponds to the operating condition associated with an increased likelihood of stall at the second target speed of the stepper motor. Additionally or alternatively, the method may comprise applying a third drive signal to operate the stepper motor at a third target speed that is greater than the first target speed in an instance in which the signal indicative of the electric current supplied to the stepper motor during the application of the first drive signal corresponds to a reduced load condition on the stepper motor, wherein the signal indicative of the electric current supplied to the stepper motor corresponds to the reduced load condition in an instance in which the amplitude of the electric current supplied to the stepper motor is less than a reduced load threshold during application of the first drive signal.

In some embodiments, the method may further comprise applying a third drive signal to operate the stepper motor at a third target speed that is greater than the second target speed in an instance in which the signal indicative of the electric current supplied to the stepper motor during the application of the second drive signal corresponds to a reduced load condition on the stepper motor, wherein the signal indicative of the electric current supplied to the stepper motor corresponds to the reduced load condition in an instance in which the amplitude of the electric current supplied to the stepper motor is less than a reduced load threshold during application of the second drive signal.

These and other features of the Applicant's teaching are set forth herein.

BRIEF DESCRIPTION OF THE DRAWINGS

Figure 1:
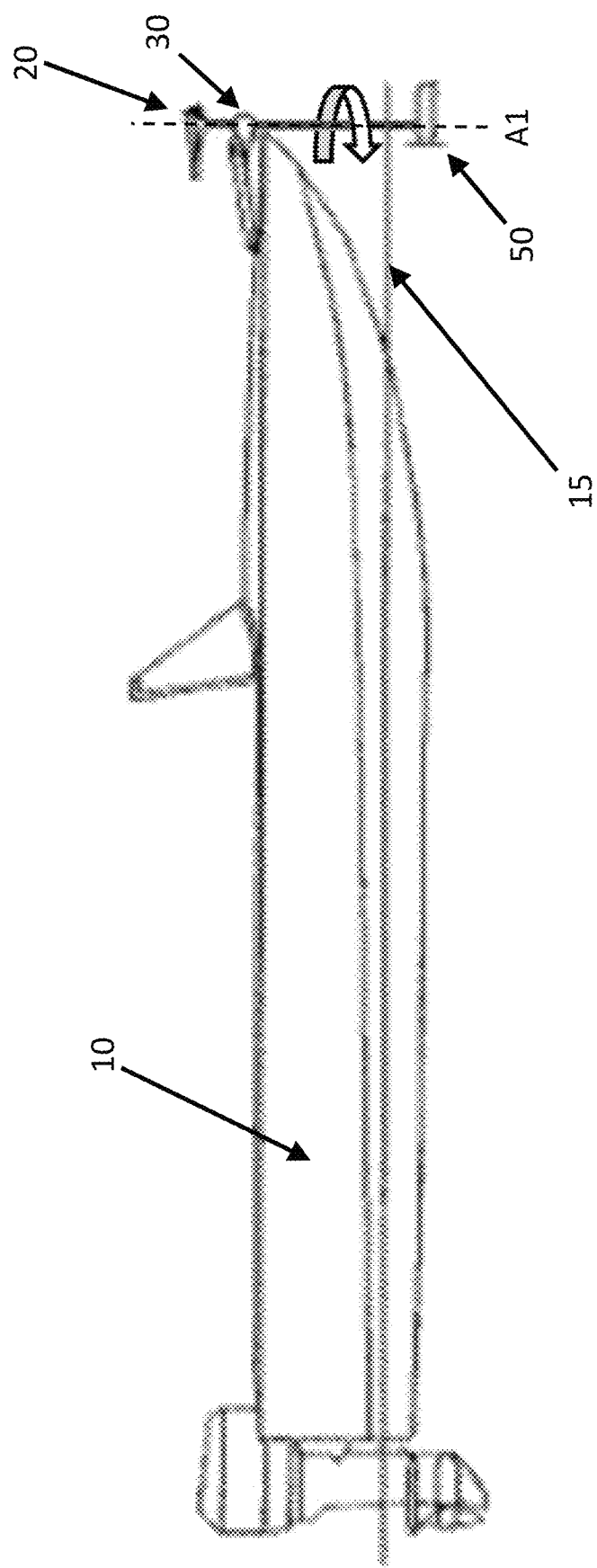
Figure 2:
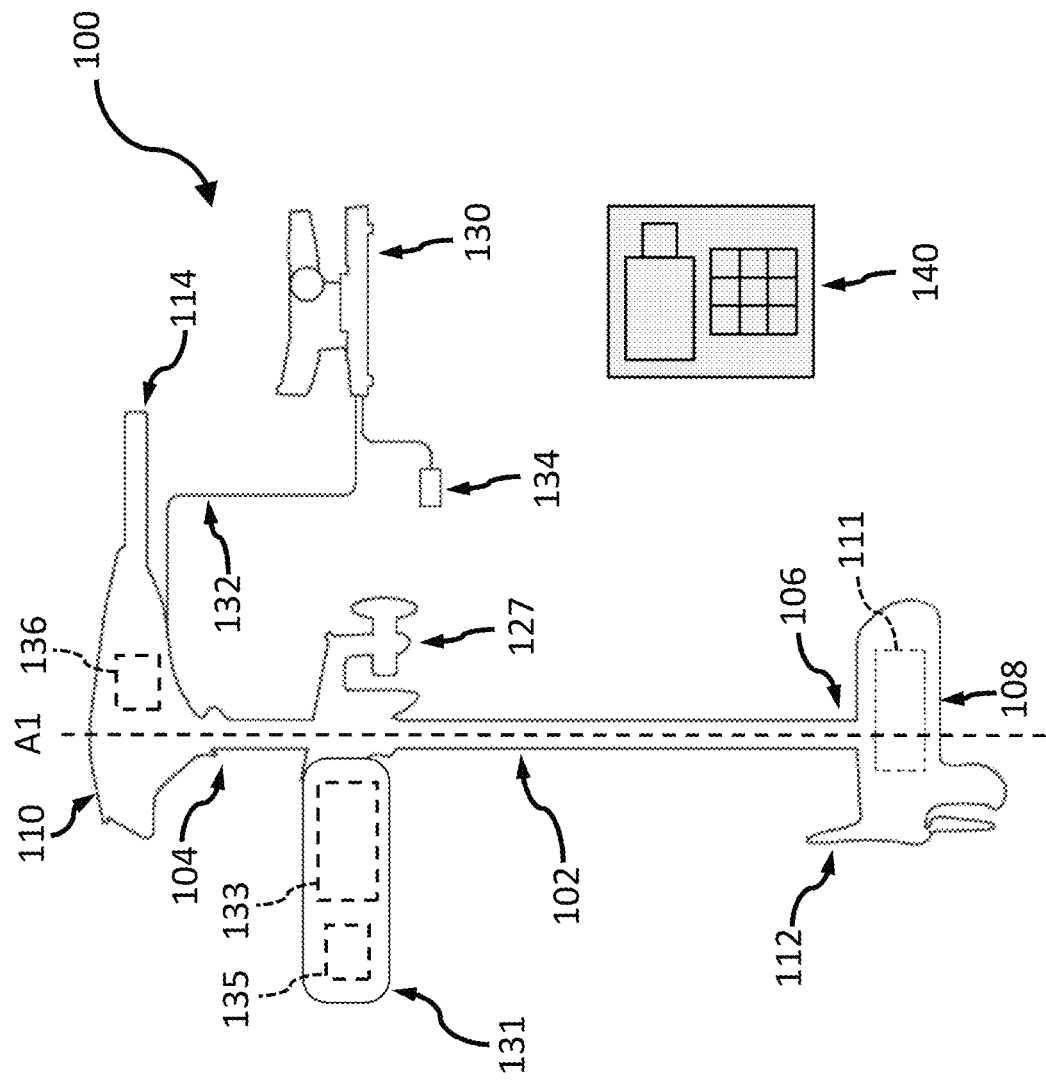
Figure 3:
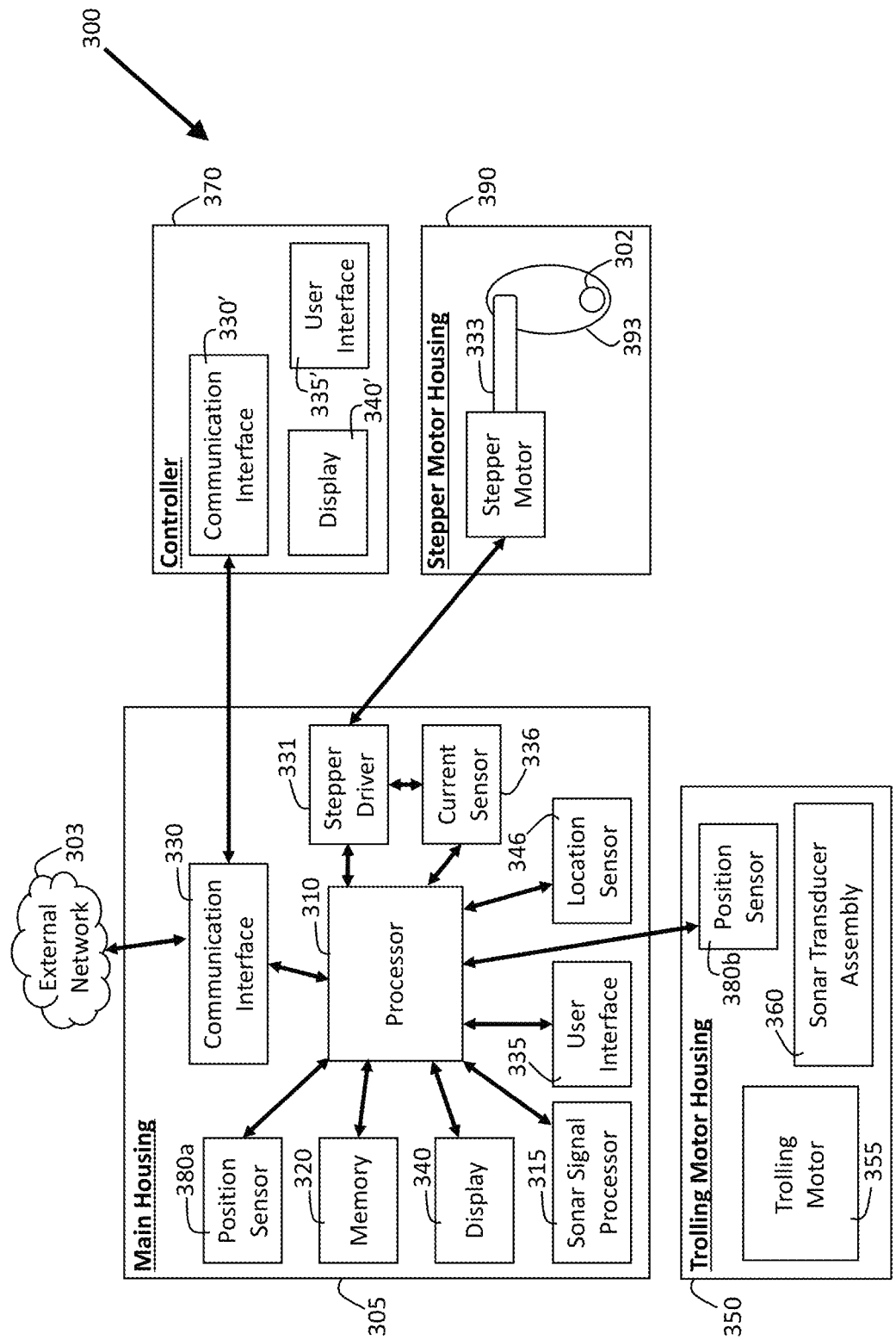
Figure 4:
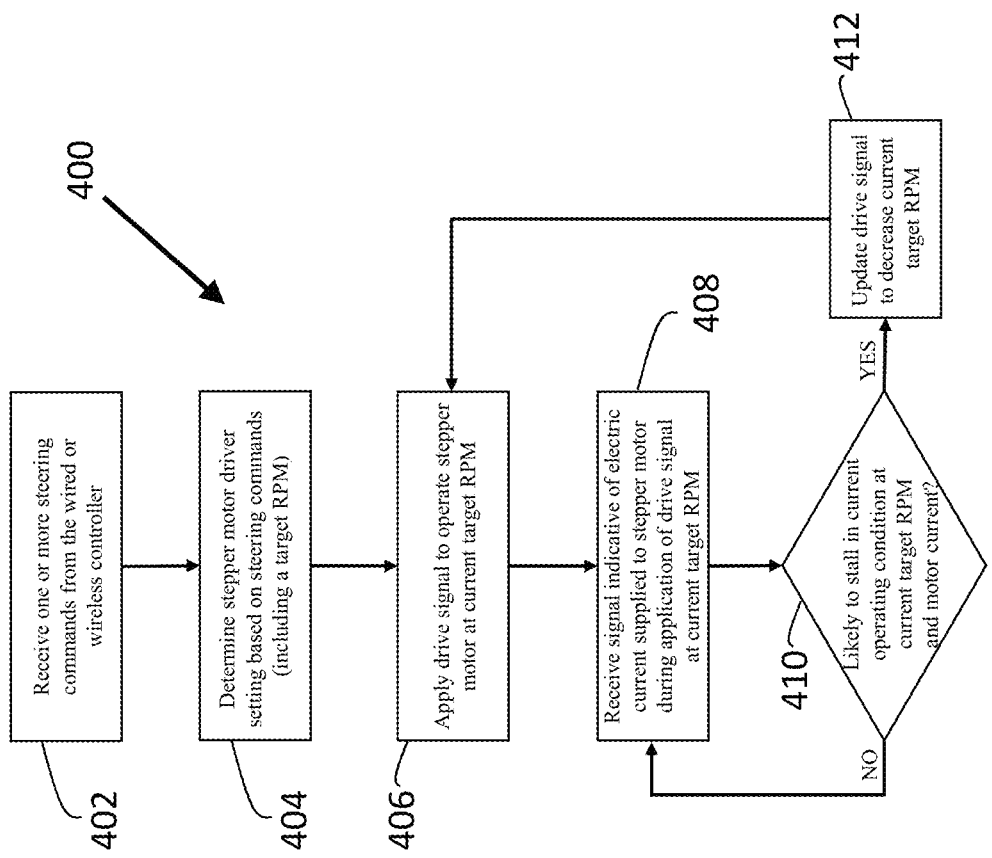
Figure 5A:
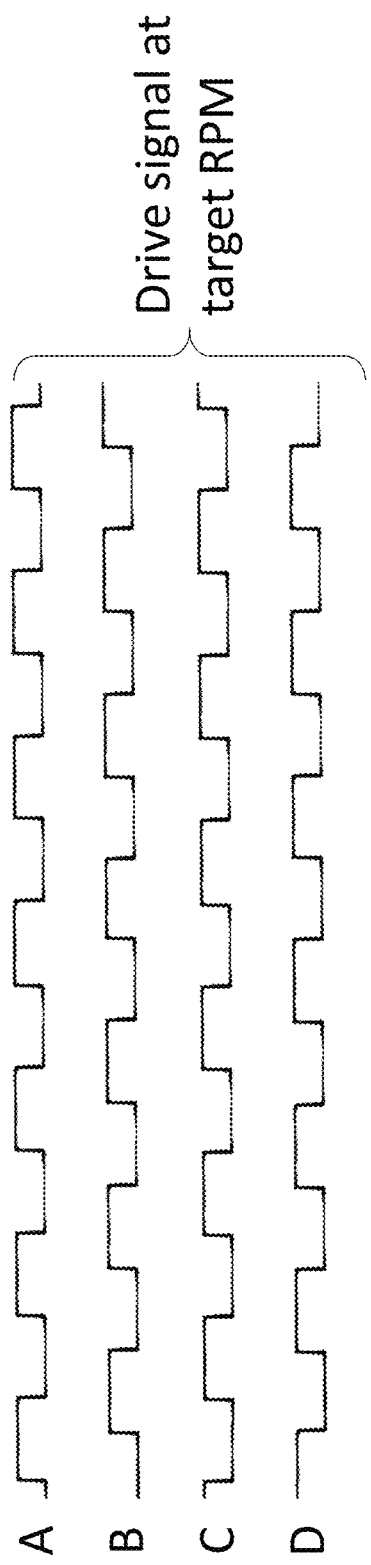
Figure 5B:
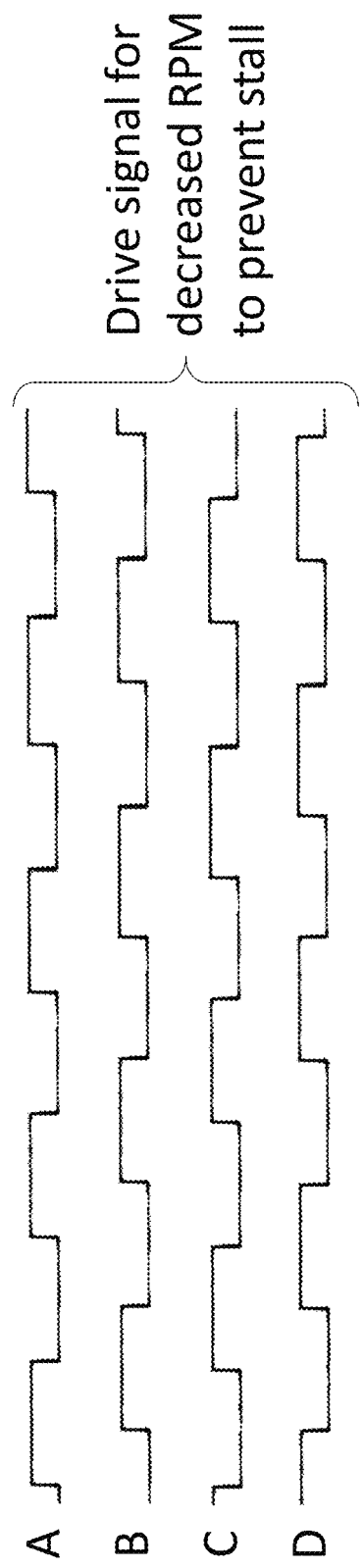
Figure 6:
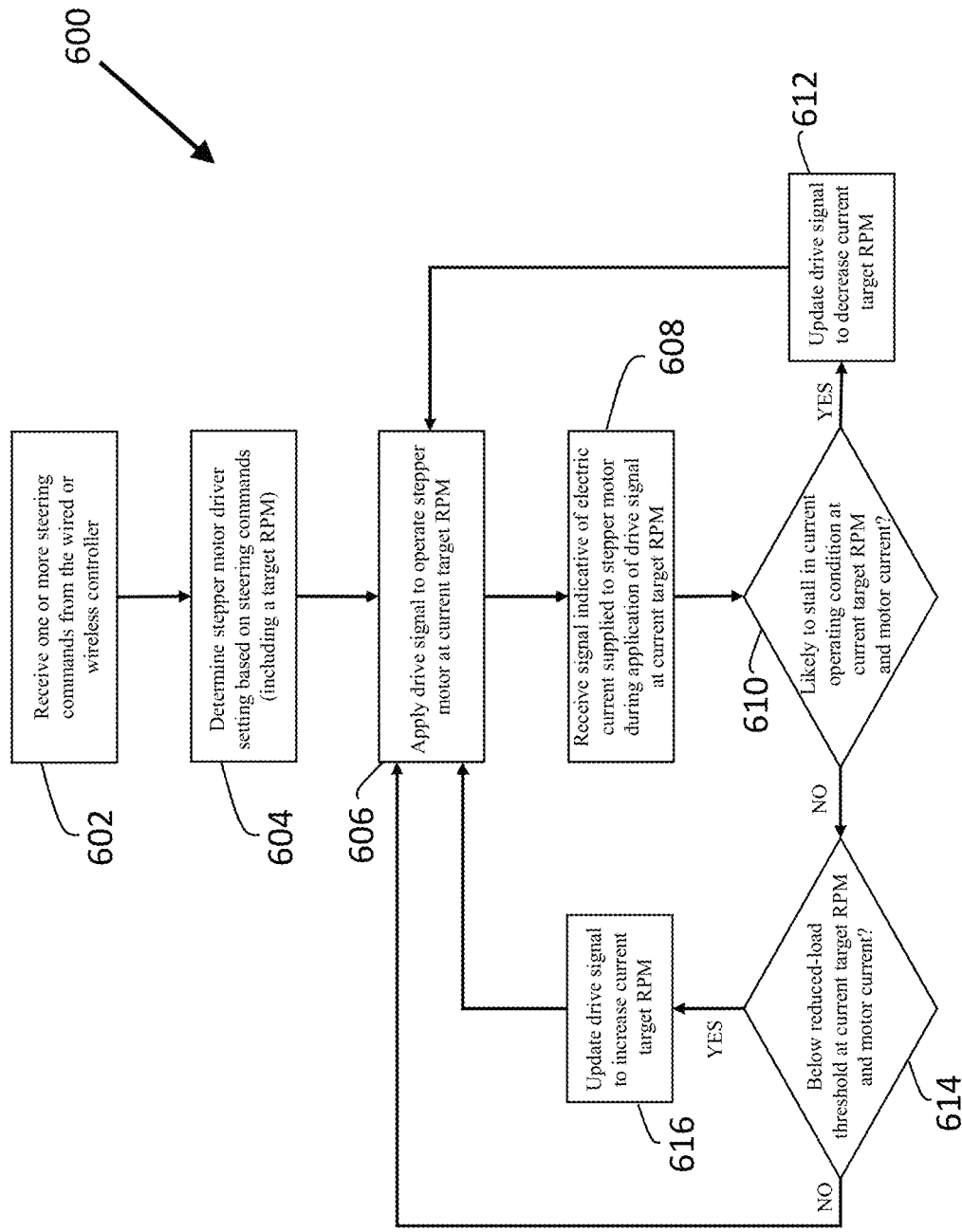
Figure 7A:
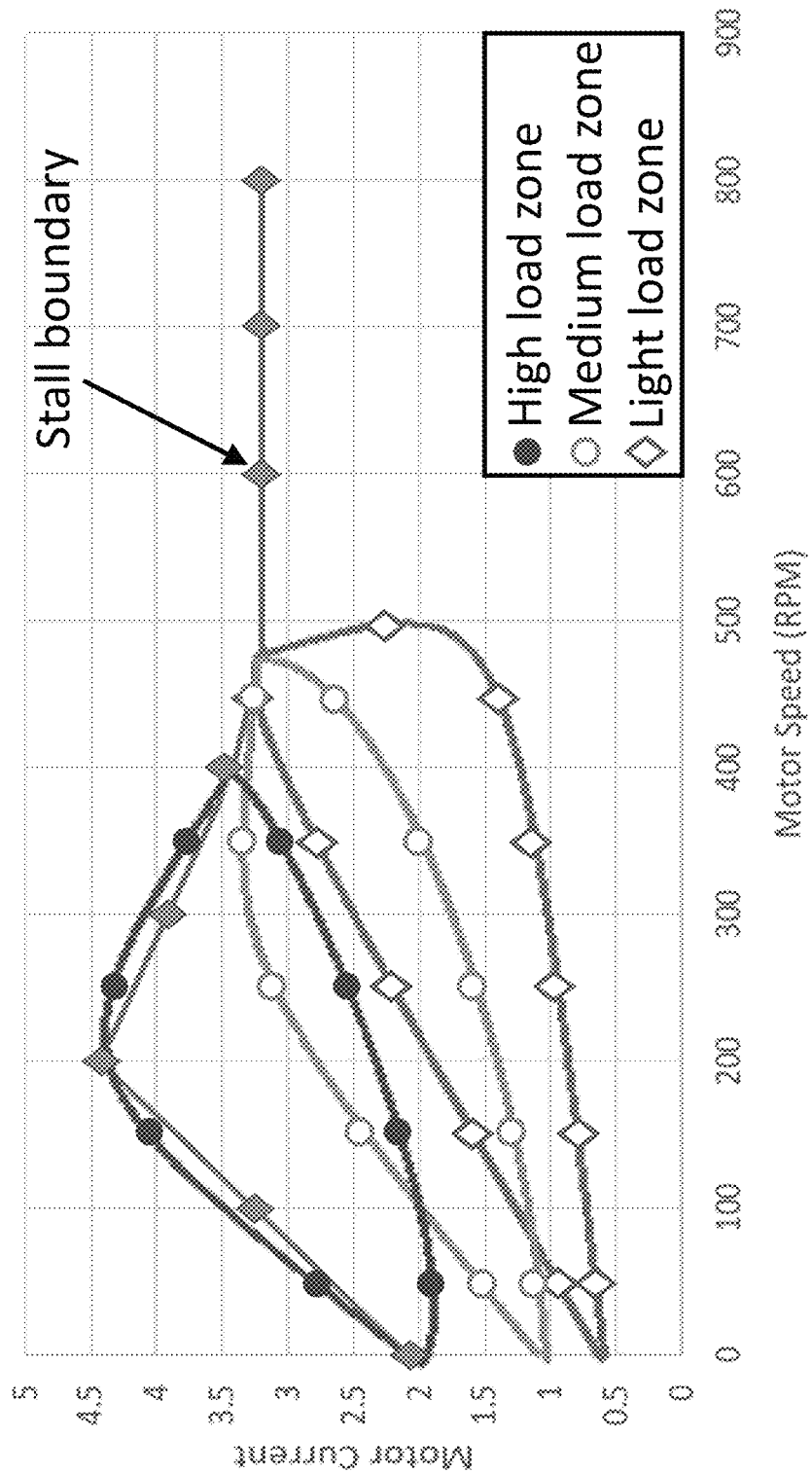
Figure 7B:
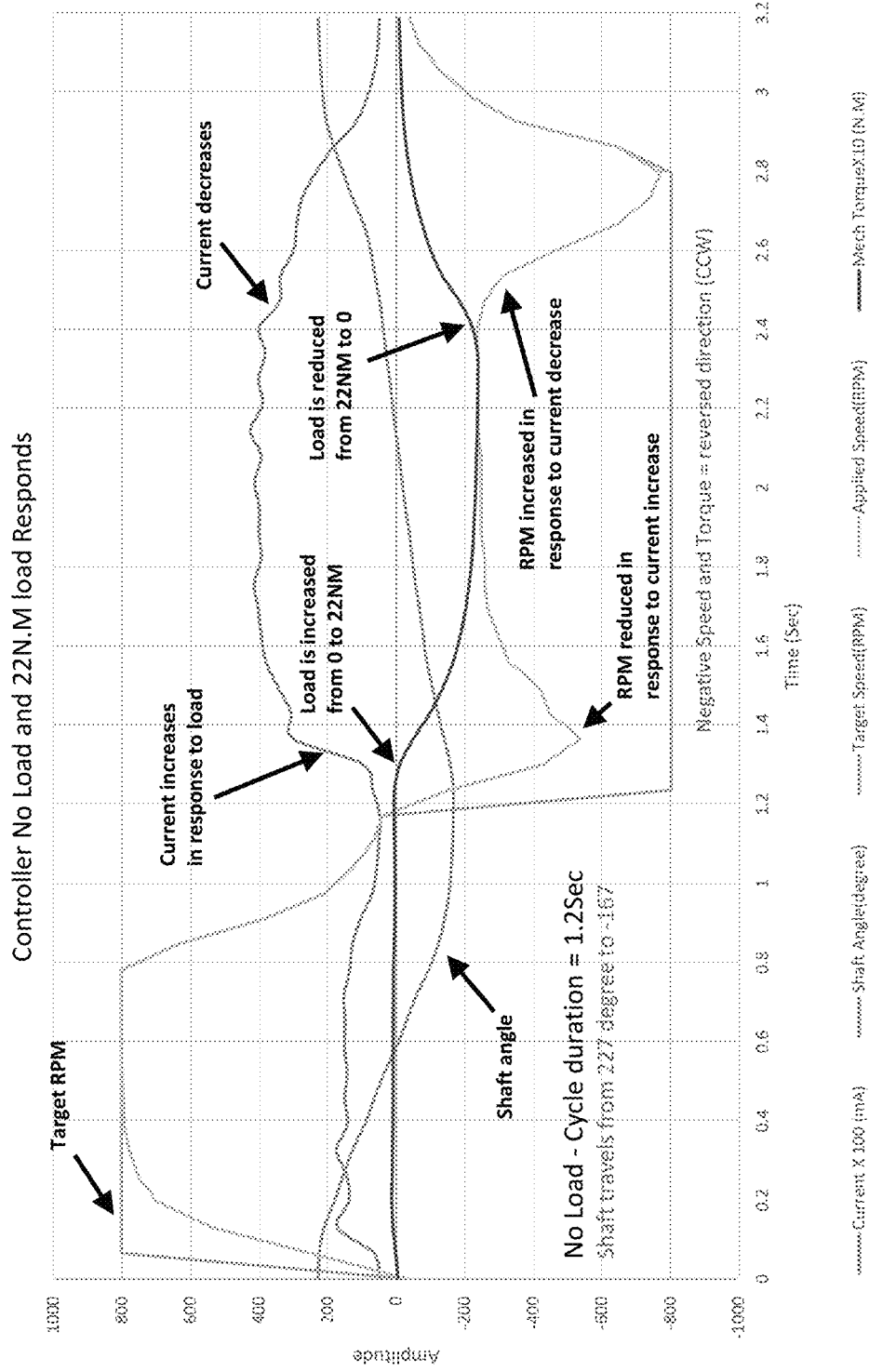

Having thus described the invention in general terms, reference will now be made to the accompanying drawings, which are not necessarily drawn to scale, and wherein:

FIG. 1 illustrates an example trolling motor assembly attached to a front of a watercraft, in accordance with some embodiments discussed herein;

FIG. 2 shows an example trolling motor system including a trolling motor assembly, in accordance with some embodiments discussed herein;

FIG. 3 shows a block diagram illustrating a trolling motor system including an example trolling motor assembly with a steering assembly, in accordance with some embodiments discussed herein;

FIG. 4 illustrates a flowchart of an example method for operating a steering assembly according to some embodiments discussed herein;

FIGS. 5A and 5B schematically depict example drive signals applied to the stepper motor according to some embodiments discussed herein; and FIG. 6 illustrates a flowchart of another example method for operating a steering assembly according to some embodiments discussed herein;

FIG. 7A shows a graph of an example stall boundary threshold for use in various example embodiments discussed herein; and FIG. 7B shows a graph illustrating example rotation cycles for a shaft of a trolling motor utilizing various example steering assemblies according to some embodiments discussed herein.

DETAILED DESCRIPTION

Exemplary embodiments of the present invention now will be described more fully hereinafter with reference to the accompanying drawings, in which some, but not all embodiments of the invention are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

Some embodiments of the present invention provide trolling motor assemblies having an electronic steering assembly comprising a stepper motor for changing the angular orientation of a watercraft's trolling motor. FIG. 1 illustrates an example watercraft 10 on a body of water 15. The watercraft 10 has a trolling motor assembly 20 attached to its front, with a trolling motor 50 submerged in the body of water. The trolling motor 50, which may be gas-powered or electric, for example, may be used as a propulsion system to provide thrust so as to cause the watercraft 10 to travel along the surface of the water. While the depicted embodiment shows the trolling motor assembly 20 attached to the front of the watercraft 10 and as a secondary propulsion system, example embodiments described herein contemplate that the trolling motor assembly 20 may be attached in any position on the watercraft 10 and/or may serve as the primary propulsion system for the watercraft 10.

In accordance with various aspects of the present teachings, the trolling motor assembly 20 depicted in the example embodiment of FIG. 1 includes a steering assembly 30 having a stepper motor for changing the angular orientation of the trolling motor 50 so as to change the direction of the trolling motor's thrust, thereby steering the watercraft 10. Stepper motors for use in accordance with the present teachings can have a variety of configurations, but are generally configured to convert a series of electrical pulses applied to the poles of the stepper motor's stator into discrete, incremental rotations (e.g., steps, micro-steps) of the stepper motor's rotor. As is known in the art, the direction, speed (RPM), and total length of rotation of a stepper motor may be controlled by applying particular electrical pulses to the poles of the stepper motor in a specific sequence. For example, a person skilled in the art would appreciate that the particular sequence of applied electrical pulses to each of the various poles of the stator is related to the rotor's direction of rotation, the speed of the stepper motor is directly related to the frequency of the electrical pulses, and the length of rotation is directly related to the total number of pulses applied. Further, a person skilled in the art would appreciate that drive signals applied to the stepper motor's poles may be commonly generated by stepper motor driver circuitry (e.g., operating under the control of a processor) that is effective to control the sequence, shape, number of incremental rotations, frequency, pulse width, etc. of the applied pulses. By coupling rotation of the stepper motor's rotor to the trolling motor 50 (e.g., directly or indirectly such as through a drive belt or drive gears) in accordance with embodiments of the present teachings, actuation of the stepper motor can be effective to rotate the trolling motor 50 as indicated by the arrow (e.g., about an axis A1 that is substantially perpendicular to the direction of thrust) to change the direction of the thrust.

As discussed in detail below, embodiments of steering assemblies in accordance with the present teaching can also comprise a steering assembly control system utilizing motor current feedback to adjust the speed of the stepper motor in response to varying load conditions. By way of example, the steering assembly control system may be configured to decrease the RPMs of the stepper motor when the stepper motor is subject to increased loads (e.g., as indicated by an increase in the electric current supplied to the stepper motor operating at a given RPM and for a given supply voltage). In various aspects, this dynamic control enables the stepper motor to operate at relatively higher RPMs under no load and low load conditions, but prevents the stepper motor from stalling as it drives the trolling motor 50 to its desired orientation if increased loads threaten to exceed the stepper motor's torque-speed curve as detected by increases in the electric current supplied to the stepper motor. In some aspects, the feedback control of stepper motor speed can further adjust the drive signal (e.g., the sequence of electrical pulses applied to the stepper motor's poles) to compensate for changes in the loads to which the stepper motor is subjected, for example, by increasing the RPMs of the stepper motor when the load is reduced or removed or by further decreasing the RPMs of the stepper motor when the load is increased. In this manner, dynamic feedback control can enable the efficient and quiet use of stepper motors in steering assemblies subjected to variable load conditions when rotating the trolling motor to a desired orientation.

Thus, in accordance with various aspects of the present teachings, the steering assembly 30 comprising a stepper motor as otherwise described herein may provide control over the direction of the trolling motor 50 (e.g., the direction of thrust, the direction of a directional sensor/sonar within the trolling motor housing, etc.) based on commands received at a wired or wireless control so as to enable a user to direct the trolling motor 50 to rotate in a desired direction. By way of non-limiting example, the wired or wireless control can be a wired foot pedal or a wireless remote control. Additionally, electronically-controlled trolling motor assemblies in accordance with the present teachings can, in connection with a location sensor such as a global position system (GPS) sensor, allow for autonomous operation of the trolling motor (e.g., to automatically follow a pre-defined path) and/or deploy a "virtual anchor" that automatically adjusts the direction and force of the trolling motor to maintain the watercraft in a substantially fixed position.

FIG. 2 illustrates an example electric trolling motor assembly 100 comprising a steering assembly having a stepper motor 133 responsive to steering commands input at the foot pedal assembly 130 and/or remote control 140 in order to steer the watercraft, as otherwise discussed herein. As shown, the trolling motor assembly 100 includes an elongate shaft 102 extending along an axis A1 between a first end 104 and a second end 106, a trolling motor housing 108, a main housing 110, and a stepper motor housing 131 that at least partially contains the stepper motor 133. Although the steering stepper motor 133 is depicted in FIG. 2 as being contained within a separate stepper motor housing 131, it will be appreciated that the steering stepper motor 133 may instead at least be partially contained within the trolling motor housing 108 or the main housing 110. Similarly, it will be appreciated that various components of steering assemblies in accordance with various aspects of the present teachings (e.g., a processor 136, the stepper motor 133, current sensor circuitry 135) may be disposed at various locations within the trolling motor assembly 100. By way of non-limiting example, the steering assembly control system may comprise a processor 136 and current sensor circuitry 135 for controlling operation of the steering stepper motor 133. As shown, the processor 136 may be disposed within the main housing 110 and may be electrically coupled to the steering stepper motor 133 while the current sensor circuitry 135 is disposed in the stepper motor housing 131 as shown in FIG. 2, by way of non-limiting example. Alternatively, for example, the current sensor circuitry may be disposed in the main housing 110 (e.g., the current sensor circuitry may be external to or within a stepper motor driver disposed within the main housing as discussed below with reference to FIG. 3) and may enable a determination of the average electric current supplied to the steering stepper motor.

As depicted in FIG. 2, the trolling motor housing 108 is attached to the second end 106 of the shaft 102 and at least partially contains a propulsion motor 111, or trolling motor, that connects to a propeller 112. Accordingly, when the trolling motor assembly 100 is attached to the watercraft 10 and the propulsion motor 111 (or trolling motor) is submerged in the water, the propulsion motor 111 is configured to propel the watercraft to travel along the body of water as shown in FIG. 1. In addition to containing the propulsion motor 111, the trolling motor housing 108 may include other components such as, for example, a sonar transducer assembly and/or other sensors or features (e.g., lights, temperature sensors, etc.).

With reference again to FIG. 2, the main housing 110 is connected to the shaft 102 proximate the first end 104 of the shaft 102 and can, in some embodiments, include a handle such as hand control rod 114 that enables mechanical steering of the propulsion motor 111 by a user (e.g., through angular rotation about axis A1) and/or moving the trolling motor assembly 100 to and from a stowed configuration.

As shown, the trolling motor assembly 100 may also include an attachment device 127 (e.g., a clamp, a mount, or a plurality of fasteners) to enable connection or attachment of the trolling motor assembly 100 to the watercraft. Depending on the attachment device used, the trolling motor assembly 100 may be configured for rotational movement relative to the watercraft about the shaft's axis A1, including, for example, 360 degree rotational movement.

In some embodiments, when the trolling motor assembly 100 is attached to the watercraft and the propulsion motor 111 is submerged in the water, the main housing 110 may be positioned out of the body of water and visible/accessible by a user. The main housing 110 may be configured to house components of the trolling motor assembly 100, such as may be used for processing marine data and/or controlling operation of the trolling motor 111 and/or stepper motor 133, among other things. For example, depending on the configuration and features of the trolling motor assembly, the trolling motor assembly 100 may contain, for example, one or more of a processor 136, a sonar assembly, memory, a communication interface, an autopilot navigation assembly, a speed actuator, and a steering actuator for the propulsion motor.

As noted above, the depicted example embodiment also includes a foot pedal assembly 130 that is enabled to control operation of the trolling motor assembly 100. Depending on its configuration, the foot pedal assembly 130 may include an electrical plug 134 that can be connected to an external power source. As otherwise discussed herein, the foot pedal assembly 130 may be electrically connected to the propulsion motor 111 and/or the stepper motor 133 (such as through the main housing 110) using a cable 132 (although it could be connected wirelessly) to enable a user to operate the trolling motor assembly 100 to control the speed and/or direction of travel of the watercraft. For example, the processor 136 associated with the steering assembly may receive one or more steering commands from the foot pedal assembly 130, and based thereon, determine a stepper motor driver setting that may include one or more of the direction, target speed (RPM), and/or the total length of rotation of the stepper motor 133 to obtain the desired position of the trolling motor housing 108. In light of the determined stepper motor driver setting, the processor 136 of the steering assembly may cause the stepper motor driver to apply a drive signal (e.g., a sequence of electrical pulses) to the stepper motor's various poles so as to actuate the stepper motor 133, thereby resulting in the desired rotation of the trolling motor housing 108 as indicated by the steering command(s).

In an example embodiment, the user may actuate the foot pedal assembly 130 to provide a steering command, which in turn may be used to cause the steering assembly to rotate the trolling motor housing 108 about axis A1 to a desired orientation. For example, the depicted foot pedal assembly 130 can include a pedal configured to be pivoted with a user's foot (e.g., toes and/or heel) from a default position shown in FIG. 2 (e.g., a position which causes the trolling motor housing 108 to be oriented such that propulsion causes the boat to go straight forward) so as to cause the trolling motor housing 108 to rotate. In some embodiments, pivoting the pedal in a first direction (e.g., when the user applies toe-down pressure on the pedal) may cause the trolling motor housing 108 to rotate about axis A1 in a clockwise direction, while pivoting the pedal in a second direction (e.g., when the user applies heel-down pressure on the pedal) instead causes the trolling motor housing 108 to rotate in a counterclockwise direction. In some such embodiments, for example, if the user toe-presses the pedal to rotate the trolling motor housing 108 in a clockwise direction, the steering assembly's processor 136 may receive an electrical signal from the pedal assembly 130 (e.g., via cable 132) and determine therefrom the necessary direction of rotation of the stepper motor 133 in order to obtain the desired clockwise rotation of the trolling motor housing 108. In some aspects, the target speed of rotation of the stepper motor 133 may be commanded by the steering command and determined by the processor 136 or may be determined to be a default, optimum RPM for efficient and/or quiet operation of the stepper motor 133 under no-load conditions, for example. The processor 136 may then cause the stepper motor driver to apply a drive signal (e.g., including a specified sequence of pulses and their frequency that achieves the direction and target RPM of the stepper motor) to the poles of the stepper motor 133 to cause rotation of the rotor in accordance with the stepper motor driver setting, thereby rotating the trolling motor housing 108 in the desired direction. In some embodiments, the steering command may also indicate a desired final orientation of the trolling motor housing 108 so as to enable the determination of the total number of pulses in the drive signal (i.e., the total length of rotation of the stepper motor) so as to achieve the desired orientation. Alternatively, as in the example above, a drive signal can be continuously applied to stepper motor 133 to rotate the trolling motor housing 108 in a clockwise direction until, for example, the user releases the toe-down pressure on the pedal.

Additionally, in accordance with various embodiments of the present teachings, the steering assembly can also include current sensor circuitry 135 as part of a feedback loop that enables adjustments by the steering assembly processor 136 to the drive signal as the drive signal is applied. The current sensor circuitry 135 can comprise any type of current sensor known in the art or hereafter developed, but is generally configured to generate a signal indicative of the current supplied to the stepper motor 133 (e.g., derived from a measurement of a voltage across one or more resistors in the stepper motor electrical circuit). By way of non-limiting example, the current sensor circuitry can provide an indication of the current applied to a part of the stepper motor (e.g., by a determination of current provided across an H-bridge within the stepper motor driver circuitry that is associated with a single pole of the stepper motor) or the stepper motor as a whole (e.g., via a measurement at a pin of a stepper motor driver, internal or external to the stepper motor driver by determining the average current applied to the plurality of poles). Without being bound by any particular theory, it has generally been found that for a stepper motor operating at a given RPM and at a given voltage of the drive signal's pulses, an increase in the load on the stepper motor increases the amplitude of the current supplied to the stepper motor during the application of the drive signal. Accordingly, if the electric current supplied to the stepper motor 133 indicates an increased likelihood of stalling at the target RPM (e.g., as the load on the stepper motor approaches or exceeds the stepper motor's torque-speed curve), the steering assembly's processor 136 may, in some embodiments, cause the drive signal to be adjusted to reduce a target speed of the stepper motor to prevent stall. That is, in the example above in which a drive signal would be continuously applied to operate the stepper motor 133 at a first target RPM until the user releases the toe-down pressure on the pedal (and thus rotate the trolling motor housing 108 in a desired direction), the steering assembly's processor 136 may automatically adjust the drive signal based on the motor current feedback (e.g., provide a second, adjusted drive signal without any change to the steering command) in order to decrease the speed of the stepper motor to a second target RPM that is less that the first target RPM.

In certain embodiments in accordance with the present teachings, as the trolling motor is driven to its desired orientation according to the steering command (e.g., as the user maintains toe-down pressure on the pedal), the current sensor circuitry 135 may continuously, periodically, or intermittently monitor the current supplied to stepper motor 133 (e.g., the average current supplied to the stepper motor 133) via current sensor circuitry 135 to enable one or more adjustments to the drive signal. By way of example, if an additional load is placed on the stepper motor 133 while operating at a decreased speed relative to the first target RPM such that the stepper motor is operating under a condition associated with an increased likelihood of stall, the signal from the current sensor circuitry 135 may be utilized by the processor 136 to further adjust the second, adjusted drive signal to further decrease the speed of the stepper motor 133 to a third target speed in order to prevent stall. Alternatively, if a sufficient decrease of the current supplied to the stepper motor 133 indicates a reduced load condition while operating at the second target RPM (e.g., that the load has been reduced or overcome as indicated by a decrease in the motor current relative to a reduced load threshold), the processor 136 may adjust the drive signal to operate the stepper motor more efficiently, for example, at a third target RPM that is greater than the second target RPM and which may be less than, equal to, or greater than the first target RPM. Likewise, if a sufficient decrease of the current supplied to the stepper motor 133 indicates a reduced load condition while operating at the first target RPM, the processor 136 may update the drive signal to operate the stepper motor at a speed that is greater than the first target RPM.

As depicted in FIG. 2, the trolling motor assembly 100 may in some embodiments additionally or alternatively include a handheld remote control 140 that may be wired or wirelessly connected to the main housing 110 to provide steering commands, similar to the steering commands discussed above with reference to the foot pedal assembly 130. The handheld control 140 may be a dedicated control or may be a control interface executed on a user device (e.g., a tablet computer, smart phone, or the like), a marine electronic device of the watercraft, or other remote operating device.

Moreover, in certain embodiments, the trolling motor assembly 100 can be enabled to utilize a location sensor, such as a global position system (GPS) sensor configured to determine a current location of the watercraft 10 (or the trolling motor assembly 100 mounted thereto), to generate steering commands that enable the watercraft to follow a pre-programmed path, repeat a path previously traversed, or maintain the watercraft in a substantially fixed position. In such example embodiments, the processor 136 may be in communication with or include a location sensor. Upon receipt of a position lock command, such as from the foot pedal assembly 130 or handheld control 140, the processor 136 may determine a first location based on location data from the location sensor and cause the trolling motor assembly 100 to maintain a location of the watercraft 10 within a predetermined threshold distance of the first location, such as 5 ft., 10 ft., or other suitable distance. For example, the processor 136 may automatically generate one or more steering commands to steer the trolling motor housing 108 to the desired direction to maintain the location of the watercraft 10 within the predetermined threshold distance. Additionally, a processor (the same or different processor as processor 136) may cause the trolling motor 111 to be energized and de-energized to propel the watercraft 10 in the desired direction with the desired thrust. While the virtual anchor or position lock feature is described above, other features, such as maintaining a heading, going to a waypoint, creating a waypoint, etc. are also contemplated herein.

Example System Architecture

FIG. 3 shows a block diagram of an example trolling motor system 300 capable for use with several embodiments of the present invention. As shown, the trolling motor system 300 may include a number of different modules or components, each of which may comprise any device or means embodied in either hardware, software, or a combination of hardware and software configured to perform one or more corresponding functions. For example, the trolling motor system 300 may include a main housing 305, a trolling motor housing 350, a stepper motor housing 390, and a controller 370.

The trolling motor system 300 may also include one or more communications modules configured to communicate with one another in any of a number of different manners including, for example, via a network. In this regard, the communication interface (e.g., 330) may include any of a number of different communication backbones or frameworks including, for example, Ethernet, the NMEA 2000 framework, GPS, cellular, WiFi, Bluetooth, or other suitable networks. The network may also support other data sources, including GPS, autopilot, engine data, compass, radar, etc. Numerous other peripheral, remote devices such as one or more wired or wireless multi-function displays may be connected to the trolling motor system 300.

As shown, the main housing 305 may include a processor 310, a sonar signal processor 315, a memory 320, a communication interface 330, a display 340, a user interface 335, and one or more sensors (e.g., location sensor 346, a position sensor 380a, etc.). The processor 310 and/or a sonar signal processor 315 may be any means configured to execute various programmed operations or instructions stored in a memory device such as a device or circuitry operating in accordance with software or otherwise embodied in hardware or a combination of hardware and software (e.g., a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor 310 as described herein.

In this regard, the processor 310 may be configured to analyze electrical signals communicated thereto to perform various functions described herein, such as determine and adjust drive signals for the steering assembly or providing display data to the display 340 (or other remote display). In some embodiments, an indication of the current stepper motor RPM (e.g., absolute speed, speed relative to a first target RPM, etc.), an indication of the load being applied to the stepper motor, and/or whether the stepper motor is operating within or near a condition associated with an increased likelihood of stall may be indicated via a user interface, such as a display. In some example embodiments, the processor 310 or sonar signal processor 315 may be configured to receive sonar data indicative of the size, location, shape, etc. of objects detected by the system 300 (such as from sonar transducer assembly 360 associated with the trolling motor housing 360). For example, the processor 310 may be configured to receive sonar return data and process the sonar return data to generate sonar image data for display to a user. In some embodiments, the processor 310 may be further configured to implement signal processing or enhancement features to improve the display characteristics or data or images, collect or process additional data, such as time, temperature, GPS information, waypoint designations, or others, or may filter extraneous data to better analyze the collected data. The processor 310 may further implement notices and alarms, such as those determined or adjusted by a user, to reflect depth, presence of fish, proximity of other watercraft, etc.

The memory 320 may be configured to store instructions, computer program code, marine data, such as stepper motor speed data, sonar data, chart data, location/position data, and other data in a non-transitory computer readable medium for use, such as by the processor 360.

The communication interface 330 may be configured to enable connection to external systems (e.g., an external network 303). In this manner, the processor 310 may retrieve stored data from a remote, external server via the external network 303 in addition to or as an alternative to the onboard memory 320.

In various aspects, one or more position sensors may be contained within one or more of the main housing 305, the trolling motor housing 350, the stepper motor housing 390, or remotely. As shown in FIG. 3, for example, a position sensor 380*a* may be in the main housing 305 and/or a position sensor 380*b* may be disposed in the trolling motor housing 355. In some embodiments, the position sensor(s) 380*a,b* may be configured to determine a direction of which the trolling motor housing is facing. In some embodiments, the position sensor(s) 380*a,b* may be operably coupled to the shaft or trolling motor housing 350, such that the position sensor(s) 380 measures the rotational change in position of the trolling motor housing 350 as the trolling motor 355 is turned. The position sensor(s) 380*a,b* may be a magnetic sensor, a light sensor, mechanical sensor, an orientation sensor, or the like.

The location sensor 346 may be configured to determine the current position and/or location of the main housing 305. For example, the location sensor 346 may comprise a GPS, bottom contour, inertial navigation system, such as micro electro-mechanical sensor (MEMS), a ring laser gyroscope, or the like, or other location detection system.

The display 340 may be configured to display images and may include or otherwise be in communication with a user interface 335 configured to receive input from a user. The display 340 may be, for example, a conventional LCD (liquid crystal display), an LED display, or the like. In some example embodiments, additional displays may also be included, such as a touch screen display, mobile device, or any other suitable display known in the art upon which images may be displayed. In any of the embodiments, the display 340 may be configured to display an indication of the current direction of the trolling motor housing 350 relative to the watercraft. Additionally, the display may be configured to display other relevant trolling motor information including, but not limited to, speed data, motor data battery data, current operating mode, auto pilot, operation mode, or the like.

The user interface 335 may include, for example, a keyboard, keypad, function keys, mouse, scrolling device, input/output ports, touch screen, or any other mechanism by which a user may interface with the system.

As shown in FIG. 3, the main housing 305 may also include a stepper motor driver 331 (e.g., circuitry operating under the control of processor 310) for applying a drive signal to the stepper motor 333. The stepper motor driver 331 may comprise any known or hereafter developed circuitry modified in accordance with the present teachings that is effective to control the sequence, shape, total number, frequency, pulse width, etc. of the pulses applied to the stepper motor. In various aspects, for example, the processor 310 can provide stepper driver motor settings comprising one or more of the maximum voltage and/or current profile of the motor's supply pulses, the number of steps or microsteps of the motor, the motor direction, the target motor speed (RPM), and/or a speed profile (e.g., rate of change of speed to achieve the desired RPM). For example, wherein stepper motors exhibit a corner speed (speeds below the corner speed feature constant torque whereas speeds above the corner speed exhibit decreasing torque), the processor 310 may accordingly provide stepper motor driver settings such that at RPMs below the corner speed can exhibit high-microstepping, while the number of micro-steps may be reduced to provide greater torque at RPMs greater than the corner speed. Likewise, stepper motor driver settings can in some aspects comprise a speed profile such that changes to the stepper motor RPM are performed in a controlled manner (e.g., RPMs may be changed in a linear, parabolic, or exponential manner). In some aspects, an exponential speed profile may be utilized to avoid jerk, for example, by smoothly increasing motor speed when operating at higher RPMs (when torque is relatively low to avoid stalling) and rapidly increasing motor speed when operating at lower RPMs (when torque is relatively high).

In accordance with some embodiments, the main housing 305 may also include current sensor circuitry 336 for generating a signal indicative of the electric current supplied to the stepper motor 333 during the application of the drive signal thereto. By way of non-limiting example, the current sensor circuitry 336 may provide an indication of the current applied to a part of the stepper motor (e.g., the current provided across an H-bridge within the stepper motor driver 331 associated with a single pole of the stepper motor) or the stepper motor 333 as a whole (e.g., via a measurement at a pin of a stepper motor driver 331, via a determination of average current applied to the stepper motor 333 at a position external to the stepper motor driver 331).

The trolling motor housing 350 may include a trolling motor 355, a sonar transducer assembly 360, and one or more other sensors (e.g., a motor sensor, position sensor 380b, water temperature sensor, water current sensor, etc.), which may each be controlled through the processor 310 (such as otherwise detailed herein).

The controller 370 may include a foot pedal assembly, such as foot pedal assembly 130 (FIG. 2) or a handheld controller, such as handheld controller 140 (FIG. 2). The controller 370 may be in communication with the processor 310 via wired or wireless communication. The controller 370 may provide steering commands to the processor 310. The processor 310 may, in turn, cause the steering assembly to steer the trolling motor housing 350 and/or operate the trolling motor 355 based on the steering commands. The controller may include a user interface 335', a display 340', and/or a communication interface 330' (such as for wired or wireless communication). In some embodiments, the controller 370 may be embodied as or within a remote computing device, such as a marine electronic device used in conjunction with the associated watercraft, a user's mobile computing device, or other remote computing device.

The display 340' may be configured to display images and may include or otherwise be in communication with a user interface 335' configured to receive input from a user. The display 340' may be, for example, a conventional LCD (liquid crystal display), an LED display, or the like. In some example embodiments, additional displays may also be included, such as a touch screen display, mobile device, or any other suitable display known in the art upon which images may be displayed. In some embodiments, the display 340' may be configured to display an indication of the current direction of the trolling motor housing 350 relative to the watercraft. Additionally, the display may be configured to display other relevant trolling motor information including, but not limited to, speed data, motor data battery data, current operating mode, auto pilot, operation mode, or the like.

The user interface 335' may include, for example, a keyboard, keypad, function keys, mouse, scrolling device, input/output ports, touch screen, or any other mechanism by which a user may interface with the system.

In an example embodiment, the stepper motor housing 390, similar to stepper motor housing 131 (FIG. 2) may include a stepper motor 333 configured to engage and rotate the shaft 302 (similar to shaft 102 (FIG. 2)) of the trolling motor assembly. For example, the motor 333 may rotate in a first direction to move a belt drive 393, gear drive, or the like to rotate the shaft 302 about axis A1 to cause the trolling motor housing 350 to be positioned to a desired angular orientation in response to steering control signals provided by the processor 310 as otherwise discussed herein. Similarly, the stepper motor 333 may rotate in a second direction opposite to the first to rotate the shaft 302 about axis A1 in the opposite direction. Though the current sensor circuitry 336 for generating a signal indicative of the electric current supplied to the stepper motor 333 is depicted in FIG. 3 as being contained within the main housing 305, it will be appreciated in light of the present teachings that the current sensor circuitry 336 can instead, for example, be disposed within the stepper motor housing 390 itself.

Example Flowchart(s) and Operations

Embodiments of the present invention provide various methods for operating a steering assembly for steering a trolling motor. Various examples of the operations performed in accordance with embodiments of the present invention will now be provided with reference to FIG. 4.

FIG. 4 illustrates a flowchart according to an example method 400 for operating a steering assembly having a stepper motor for steering a trolling motor. The operations illustrated in and described with respect to FIG. 4 may, for example, be performed by, with the assistance of, and/or under the control of one or more of the processor 310, current sensor 336, sonar signal processor 315, memory 320, communication interface 330, user interfaces 335, location sensor 346, display 340, position sensor 380, and controller 370 (FIG. 3).

The method 400 for operating the steering assembly depicted in FIG. 4 may include receiving one or more steering commands from the wired or wireless controller at operation 402 and determining a stepper motor driver setting based on the steering command at operation 404, wherein the stepper motor driver setting comprises an initial target speed of the stepper motor. In various aspects, for example, determining the initial target RPM may comprise deriving the target RPM from the steering command itself or setting the motor speed to a default RPM (e.g., an RPM providing for optimum transfer of electrical power to mechanical power under no-load conditions, a setting for optimal efficiency and reduced noise during operation of the stepper motor under various load conditions). Additionally, in some aspects, the stepper motor driver setting can include a direction of rotation of the stepper motor and/or the total length of rotation (e.g., number of turns) of the stepper motor's rotor in order to effectuate the desired change in orientation of the trolling motor as indicated by the steering command. It will also be appreciated in light of the present teachings that the stepper motor driver setting can comprise one or more of the maximum supply voltage and/or a target current profile, the number of steps or micro-steps of the motor, and/or a target speed profile, all by way of non-limiting example.

The method 400 can further include applying a drive signal to the stepper motor in operation 406. For example, the drive signal can initially be derived in accordance with the stepper motor driver setting determined in operation 404 so as to cause the steering assembly to change the orientation of the trolling motor housing in response to the steering command. As discussed otherwise herein, for example, the desired direction, speed, and/or length of rotation indicated by the stepper motor driver setting may cause a stepper motor driver to apply a first drive signal comprising a particular sequence of electrical pulses to the poles of the stepper motor, wherein the sequence of pulses applied to the various poles of the stator is related to the rotor's direction of rotation, with the frequency of pulses being directly related to the speed of the stepper motor, and the total number of pulses being directly related to the length of rotation.

By way of example with reference now to FIG. 5A, a portion of an example full-step, two-phase on drive signal is schematically depicted for an example stepper motor having four phases or poles (designated A, B, C, D). Because each pulse may be effective to rotate the rotor a discrete increment (e.g., step, micro-step), the speed of the stepper motor is determined by the frequency of the electrical pulses. Moreover, as will be appreciated by a person skilled in the art, the example drive signal shown in FIG. 5A exhibits a 90° delay between each of the phases, thereby producing a desired direction of rotation of the rotor as the various poles are energized and de-energized according to the sequence (the direction of rotation can be reversed if D instead leads C, which leads B, which leads A). It will further be appreciated that though the sequence of pulses is represented as a plurality of square, waves and represents a full-step, two-phase on mode of operation, suitable drive signals for stepper motors in accordance with the present teachings can comprise a variety of waveforms (e.g., square, rectangular, saw-tooth, sinusoidal) and can be operated in a variety of modes (e.g., one-phase on full step, two-phase on full step, half step, micro-stepping, etc.), all by way of non-limiting example.

With reference again to FIG. 4, the method 400 can further include receiving a signal indicative of the electric current supplied to the stepper motor during the application of the drive signal in operation 408. In operation 410, it can be determined whether the stepper motor is at risk of stalling while operating at the current operating conditions. By way of example, it can be determined whether the signal indicative of the electric current supplied to the stepper motor (also referred to herein as the motor current) corresponds to an operating condition associated with an increased likelihood of stall. In various embodiments, an increased load on the stepper motor operating at the initial target RPM (as determined by the drive signal) may be indicated by an increase of the amplitude of the current supplied to the stepper motor, and if that current amplitude surpasses a threshold, the stepper motor may exhibit an increased likelihood of stall. As discussed below with reference to FIG. 7A such a threshold can represent a stall boundary (or within a certain amount thereof) that can be determined based on a relationship between the electric current supplied to the stepper motor and the stepper motor speed (RPM), for example. Additionally or alternatively, in some embodiments, an increased likelihood of stall may be determined if the rate of change of the electric current supplied to the stepper motor is greater than a threshold at the target speed of the stepper motor.

In some embodiments, in an instance in which it is determined in operation 410 that the stepper motor exhibits an increased likelihood of stall at the current operating conditions, the method 400 can further include updating or adjusting the drive signal to reduce the speed of the stepper motor in operation 412 and applying the adjusted drive signal to the stepper motor in operation 406 to operate the stepper motor at the current target RPM. Again by way of non-limiting example and with reference now to FIG. 5B, a portion of the full-step, two-phase on drive signal of FIG. 5A is schematically depicted as having been updated (as in operation 412) to decrease the target RPM of the stepper motor. In particular, the example updated drive signal of FIG. 5B exhibits a reduced frequency of pulses relative to the initial drive signal of FIG. 5A such that each incremental rotation of the stepper motor takes relatively longer, thereby decreasing the current target RPM of the stepper motor relative to the initially-determined target RPM. As discussed otherwise herein, reducing the speed of the stepper motor can assist in preventing stall by ensuring that the load on the stepper motor does not exceed the motor's torque-speed curve.

However, referring again to operation 410, in an instance in which it is determined that the motor current and current target RPM do not correspond to an operating condition having an increased likelihood of stall, the original drive signal (e.g., the drive signal of FIG. 5A) may continue to be applied, for example, until the desired orientation of the trolling motor is achieved and/or the motor current signal received in step 408 indicates an updated drive signal is needed to prevent stall. That is, as indicated by the loop in FIG. 4, the motor current may be continuously, periodically, or intermittently checked to determine if the motor current throughout the application of the drive signal corresponds to an operating condition associated with an increased likelihood of stall, with adjustments to the drive signal effective to decrease the speed of the stepper motor being provided to prevent stall as otherwise discussed herein. It will be appreciated, for example, if an additional load is placed on the stepper motor, the example method 400 of FIG. 4 can further reduce motor speed to prevent stall of a stepper motor operating at a current target RPM than that initially determined in operation 404. By way of example, if during the application of the adjusted drive signal it is determined at step 410 that the load has increased (or the adjusted drive signal insufficiently reduced the motor speed to address the risk of stall), the method 400 may further comprise applying a second adjusted drive signal to operate the stepper motor at a second decreased speed relative to the first decreased speed (as in operations 412 and 406).

FIG. 4 illustrates a flowchart of a system, method, and computer program product according to an example embodiment. It will be understood that each block of the flowchart, and combinations of blocks in the flowchart, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 420 and executed by, for example, the processor 410. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device to cause a series of operations to be performed on the computer or other programmable apparatus to produce a computer-implemented process such that the instructions which execute on the computer or other programmable apparatus implement the functions specified in the flowchart block(s).

With reference now to the example method 600 in FIG. 6, in various embodiments, feedback control methods that are effective to decrease the speed of the stepper motor from its current target RPM in response to detection of a likely stall condition as in FIG. 4, may also be utilized to adjust the drive signal to increase the target RPM as operating conditions change. By way of example, feedback control systems and methods in accordance with the present teachings may also increase the current target RPM relative to either a decreased current target RPM (or from the initial target RPM) so as to increase the efficiency of transfer from electrical power to mechanical power if the load has been reduced or overcome. Operations 602, 604, 606, 608, 610, and 612 of method 600, for example, substantially correspond to operations 402, 404, 406, 408, and 410 depicted in FIG. 4 and described above. However, the example method 600 of FIG. 6 differs from that of FIG. 4 in that after a determination in step 610 that the motor current and current target RPM do not correspond to an operating condition having an increased likelihood of stall, it can be determined in operation 614 whether the RPM can be increased in an instance in which motor current feedback indicates a reduced-load condition in which the load on the stepper motor has been reduced or removed. In some embodiments, the reduced-load condition may be indicated, for example, by decreases in the amplitude of the motor current at a given RPM and supply voltage of the stepper motor relative to a reduced load threshold. In some embodiments, for example, the reduced load threshold may be determined theoretically or empirically (e.g., based on a known relationship between motor current and RPM) or may be based on changes to the measured motor current. By way of non-limiting example, the reduced load threshold may represent a current value of 10%, 20%, 30%, etc. less than the maximum motor current exhibited at a given target speed, a current value of 10%, 20%, 30%, etc. less than the maximum motor current over a previous pre-defined period (e.g., 0.25 seconds), or a current value of 10%, 20%, 30%, etc. less than a previous substantially steady state current value at the target RPM. In such instances, the drive signal can be adjusted in operation 616 to increase the current target RPM. In various embodiments, the increased target RPM speed provided by the drive signal may be a speed less than, equal to, or greater than the initial target RPM.

As in method 400 of FIG. 4 above, the method 600 may also enable the motor current to be continuously, periodically, or intermittently checked, but in this case to determine if the motor current corresponds to a likely stall condition or a reduced-load condition, with respective decreases or increases to the target motor RPM being provided to improve the operation of the steering assembly.

Example Stall Thresholding and Rotation Cycles

The Applicant's teachings can be even more fully understood with reference to the following example and data presented in FIGS. 7A and 7B, which are provided to demonstrate but not limit the present teachings.

With reference first to FIG. 7A, a plot of current supplied to the stepper motor and motor speed is provided for a given steering assembly in accordance with various aspects of the present teachings. Because stepper motors may stall if the load on the motor shaft exceeds the motor torque-speed curve, a stall boundary (closed diamonds) can be determined based on the relationship between the electric current supplied to the stepper motor and the stepper motor speed (RPM), for example. This boundary can be determined empirically (e.g., via experimentation) or can be calculated for a particular steering motor assembly based on the size of the stepper motor, the size of the gear box, dynamic torque requirements, and/or the response time of full speed rotation, all by way of non-limiting example. Accordingly, in various embodiments of the present systems and methods, the motor current feedback system may be effective to adjust the speed of the stepper motor as otherwise discussed herein if the motor current exceeds the stall boundary so as to prevent stall.

While the stall boundary of FIG. 7A may represent an example threshold for indicating a likely stall condition in accordance with the present teachings, it will be appreciated that other thresholds may alternatively be used to indicate a need to adjust the drive signal. For example, the threshold can represent a percentage of the current at the stall boundary at the current RPM. By way of non-limiting example, the drive signal can be adjusted in accordance with embodiments of the present teachings if the detected motor current becomes within 20%, within 10%, within 5% of the current at the stall boundary line determined for a steering assembly. While the amplitude of the current is depicted in FIG. 7A, it will be appreciated that other aspects of the motor current supplied to the stepper motor can additionally or alternatively be used to detect a stall condition. By way of example, detection of a sudden increase in motor current (i.e., a high rate of change) may also indicate an increased likelihood of stall. Accordingly, in some embodiments, if the rate of change of the amplitude of the signal indicative of electric current supplied to the stepper motor is greater than a threshold at the target speed of the stepper motor, the drive signal may also be adjusted in accordance with various aspects of the present teachings.

Though the stepper motor utilized to produce the plots of FIGS. 7A and 7B may exhibit reduced audio noise and optimum transfer of electrical power (i.e., from the drive signal) to mechanical power at a speed of about 800 RPM, the speed of the stepper motor may be operated at decreased RPMs in accordance with the present teachings in response to increased loads on the motor in order to prevent stall. FIG. 7A depicts various preferred zones for operating the stepper motor depending on the load to which the stepper motor is subjected. For example, at relatively high loads, the stepper motor may be generally operated within the zone defined by the closed circles. In such high load circumstances, the current supplied to the motor exceeds the stall boundary current of about 3 amperes (A) at 800 RPM, but a reduction of the speed of the stepper motor to about 200 RPM increases available torque while the current increases to about 4.5 A without exceeding the motor speed-torque curve at this reduced target RPM. In such aspects, this reduction in RPM may enable increased motor power to be transferred to the load. Likewise, it will be appreciated that the stepper motor can operate at 200 RPM for both medium loads (open circle) and light loads (open diamond), and that the amplitude of the current supplied to the stepper motor at a given RPM is generally correlated with the amount of load. That is, a high load at 200 RPM tends to require increased motor currents relative to medium and light loads at 200 RPM, and a medium load at 200 RPM generally requires increased motor currents relative to a low load. In certain embodiments, the application of additional load as indicated by an increase in detected current may thus not (at least initially) require a reduction in the RPM to avoid stall. For example, for a stepper motor operating in accordance with a target current profile at the lower boundary of the light load zone (e.g., set to avoid excess currents that causes heating and vibration), an increase in load may be addressed by increasing the current profile (e.g., increasing available current at that RPM) to correspond to the lower boundary of the medium load zone while nonetheless preventing stall at the current target RPM. Additional current profiles can also be subsequently applied to avoid stall at the current target RPM until, for example, the increased current is greater than the stall threshold at the current target RPM as otherwise discussed herein.

In light of this example, it will be appreciated that a reduced-load condition may also be indicated in accordance with the present teachings by the detected motor current decreasing below the boundary of the high-load zone at the current target value of 200 RPM (e.g., ~2.25 A), and the load being further reduced when the detected motor current decreases below the boundary of the medium load zone at the current target value of 200 RPM (e.g., ~1.5 A).

Moreover, based on the plot of FIG. 7A, it will further be appreciated that a stepper motor subject to a medium load may be more efficiently operated (e.g., with greater power) at a higher RPM while nonetheless avoiding the risk of stall. Similarly, a stepper motor subject to a light load may be more efficiently operated at an even higher RPM than a stepper motor subject to a medium load while avoiding stall. Accordingly, in various embodiments, the methods and systems in accordance with the present teachings may determine or estimate the load to which the stepper motor is subject, for example, based on the characteristics of the detected current (e.g., amplitude, rate of change) and increase a target RPM that enables more efficient operation at the particular load conditions.

With reference now to FIG. 7B, a plot is provided depicting the operation of a steering assembly utilizing motor current feedback to prevent stall in accordance with embodiments of the present teachings. The example steering assembly comprises the stepper motor utilized for FIG. 7A and depicts an example feedback response when a load is added to the shaft of the trolling motor assembly during rotation thereof. As shown in FIG. 7B, the current supplied to the motor and the applied speed are measured synchronously as the shaft is rotated from 227° to −167° without any load applied and its direction is reversed to rotate from −167° to 227° while a 22 NM load is applied to the shaft with a magnetic brake. The driver setting is initially selected to produce a steady state target speed of 800 RPM and the drive signal is applied in accordance with the driver setting. As shown on the left side of FIG. 7B when no load is applied, the stepper motor achieves the target RPM at t≈0.4 seconds utilizing an exponential speed profile to reduce jerk and drives the full rotation of the shaft to −167° in about 1.2 seconds (the target and applied RPM decreases from t≈0.8 seconds to about t≈1.2 seconds due to a stepper motor position feedback loop as the shaft's angular position error decreases). It will be observed that at the target speed of 800 RPM, the maximum detected current is 1.8 A under the no-load conditions, which is below the stall boundary shown in FIG. 7A. Accordingly, in accordance with some embodiments of the present teachings, no motor current feedback based adjustments to the drive signal are thus provided as the shaft is rotated from 227° to −167° because the maximum amplitude of detected current does not correspond to an increased likelihood of stall.

Starting at t≈1.2 seconds, the sequence of the pulses of the drive signal applied to the stepper motor is reversed so as to reverse the direction of the shaft's rotation, but is initially otherwise identical to that of the first cycle. However, at t≈1.3 seconds, the 22 NM magnetic brake is applied, which almost immediately increases the amplitude of the current supplied to the motor to about 3 A, which represents a likely stall condition at 800 RPM as indicated in FIG. 7A. In accordance with various embodiments of the present teachings, the detected increase in current to a level that exceeds the stall boundary results in an adjustment to the drive signal to decrease the stepper motor speed from about −600 RPM at t≈1.4 seconds to about −200 RPM at t≈1.6 seconds. Though the current further increases to about 4.1 A during the application of the load, the current is maintained within the heavy load zone and beneath the stall boundary at 200 RPM as shown in FIG. 7A, thereby overcoming the load and preventing stall. As shown in FIG. 7B, the magnetic brake is applied until about 2.4 seconds, at which time the load is reduced, as indicated by the decreased current supplied to the stepper motor. As the load is removed and the current decreases to a level substantially below the stall boundary at 200 RPM, the drive signal is again adjusted based on the motor current feedback to increase the speed to the steady state target speed of 800 RPM to finish the rotation of the shaft. It will be appreciated that the shaft angle changed more slowly during the application of the magnetic brake under the influence of the controller (i.e., the shaft angle has a smaller slope from t≈1.4 seconds to t≈2.4 seconds) such that it required about 2 seconds to drive the full rotation of the shaft from −167° to 227°.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

The invention claimed is:

1. A trolling motor assembly configured for attachment to a watercraft, the trolling motor assembly comprising:
   a shaft defining a first end and a second end;
   a trolling motor at least partially contained within a trolling motor housing, wherein the trolling motor housing is attached to the second end of the shaft, wherein, when the trolling motor assembly is attached to the watercraft and the trolling motor housing is submerged in a body of water, the trolling motor, when operating, is configured to propel the watercraft to travel along the body of water;
   a main housing connected to the shaft proximate the first end of the shaft, wherein the main housing is configured to be positioned out of the body of water when the trolling motor assembly is attached to the watercraft and the trolling motor housing is submerged in the body of water;
   a steering assembly comprising a stepper motor, the steering assembly configured to rotate the trolling motor housing about a first axis defined by the shaft to a plurality of positions; and
   a steering assembly control system, the steering assembly control system comprising:
      a processor;
      current sensor circuitry for generating a signal indicative of an electric current supplied to the stepper motor; and
      a memory including program code configured to, when executed, cause the processor to:
         receive a steering command;
         determine a stepper motor driver setting based on the steering command, wherein the stepper motor driver setting comprises a first target speed of the stepper motor;

apply a first drive signal to operate the stepper motor at the first target speed in accordance with the stepper motor driver setting so as to cause the steering assembly to rotate the trolling motor housing about the first axis in response to the steering command;

receive the signal indicative of the electric current supplied to the stepper motor during the application of the first drive signal; and provide a second drive signal to operate the stepper motor at a second target speed that is less than the first target speed in an instance in which the signal indicative of the electric current supplied to the stepper motor during the application of the first drive signal corresponds to an operating condition associated with an increased likelihood of stall, wherein the first drive signal comprises a plurality of DC voltage pulses that each represents a discrete, incremental rotation of the stepper motor, wherein the second drive signal is provided by:

decreasing a frequency of the DC voltage pulses of the first drive signal; or increasing a pulse width of the DC voltage pulses of the first drive signal.

2. The trolling motor assembly of claim 1, wherein an amplitude of the signal indicative of the electric current supplied to the stepper motor during the application of the first drive signal is positively correlated with a load on the stepper motor.

3. The trolling motor assembly of claim 1, wherein the signal indicative of the electric current supplied to the stepper motor corresponds to the operating condition associated with an increased likelihood of stall in an instance in which an amplitude of the electric current supplied to the stepper motor is greater than a stall threshold at the first target speed of the stepper motor.

4. The trolling motor assembly of claim 3, wherein the stall threshold represents a stall boundary.

5. The trolling motor assembly of claim 3, wherein the stall threshold is pre-determined empirically.

6. The trolling motor assembly of claim 1, wherein the second drive signal is provided by decreasing a frequency of the DC voltage pulses of the first drive signal.

7. The trolling motor assembly of claim 1, wherein the second drive signal is provided by increasing a pulse width of the DC voltage pulses of the first drive signal.

8. The trolling motor assembly of claim 1, wherein the signal indicative of the electric current supplied to the stepper motor corresponds to the operating condition associated with an increased likelihood of stall in an instance in which a rate of change of an amplitude of the signal is greater than a stall rate of change threshold at the first target speed of the stepper motor.

9. The trolling motor assembly of claim 1, wherein the program code is further configured to, when executed, cause the processor to:

provide a third drive signal to operate the stepper motor at a third target speed that is less than the second target speed in an instance in which the signal indicative of the electric current supplied to the stepper motor during the application of the second drive signal corresponds to the operating condition associated with an increased likelihood of stall at the second target speed of the stepper motor.

10. The trolling motor assembly of claim 1, wherein the program code is further configured to, when executed, cause the processor to:

provide a third drive signal to operate the stepper motor at a third target speed that is greater than the first target speed in an instance in which the signal indicative of the electric current supplied to the stepper motor during the application of the first drive signal corresponds to a reduced load condition on the stepper motor, wherein the signal indicative of the electric current supplied to the stepper motor corresponds to the reduced load condition in an instance in which an amplitude of the electric current supplied to the stepper motor is less than a reduced load threshold during application of the first drive signal.

11. The trolling motor assembly of claim 1, wherein the program code is further configured to, when executed, cause the processor to:

provide a third drive signal to operate the stepper motor at a third speed that is greater than the second target speed in an instance in which the signal indicative of the electric current supplied to the stepper motor during the application of the second drive signal corresponds to a reduced load condition on the stepper motor, wherein the signal indicative of the electric current supplied to the stepper motor corresponds to the reduced load condition in an instance in which an amplitude of the electric current supplied to the stepper motor is less than a reduced load threshold during application of the second drive signal.

12. The trolling motor assembly of claim 1, wherein the current sensor circuitry is configured to generate a signal indicative of the average electric current supplied to the stepper motor.

13. The trolling motor assembly of claim 1, wherein the stepper motor driver setting further comprises a first target current at the first target speed, and wherein the program code is further configured to, when executed, cause the processor to:

while maintaining the first target speed, adjust a current profile to provide a second target current that is greater than the first target current at a first target RPM in an instance in which the signal indicative of the electric current supplied to the stepper motor during the application of the first drive signal corresponds to an operating condition associated with an increased likelihood of stall.

14. A method comprising:

receiving a steering command for a trolling motor assembly, wherein the trolling motor assembly is configured for attachment to a watercraft, wherein the trolling motor assembly comprises:

a shaft defining a first end and a second end;

a trolling motor at least partially contained within a trolling motor housing, wherein the trolling motor housing is attached to the second end of the shaft, wherein, when the trolling motor assembly is attached to the watercraft and the trolling motor housing is submerged in a body of water, the trolling motor, when operating, is configured to propel the watercraft to travel along the body of water;

a main housing connected to the shaft proximate the first end of the shaft, wherein the main housing is configured to be positioned out of the body of water when the trolling motor assembly is attached to the watercraft and the trolling motor housing is submerged in the body of water;

a steering assembly comprising a stepper motor, the steering assembly configured to rotate the trolling motor housing about a first axis defined by the shaft to a plurality of positions;

determining a stepper motor driver setting based on the steering command, wherein the stepper motor driver setting comprises a first target speed of the stepper motor;

applying a first drive signal to operate the stepper motor at the first target speed in accordance with the stepper motor driver setting so as to cause the steering assembly to rotate the trolling motor housing about the first axis in response to the steering command;

receiving a signal indicative of an electric current supplied to the stepper motor during the application of the first drive signal; and applying a second drive signal to operate the stepper motor at a second target speed that is less than the first target speed in an instance in which the signal indicative of the electric current supplied to the stepper motor during the application of the first drive signal corresponds to an operating condition associated with an increased likelihood of stall, wherein the first drive signal comprises a plurality of DC voltage pulses that each represents a discrete, incremental rotation of the stepper motor, wherein the second drive signal comprises:

a decreased frequency of the DC voltage pulses as compared to the first drive signal; or an increased pulse width of the DC voltage pulses as compared to the first drive signal.

15. The method of claim 14, wherein the signal indicative of electric current supplied to stepper motor corresponds to the operating condition associated with an increased likelihood of stall in an instance in which an amplitude of the electric current supplied to the stepper motor is greater than a stall threshold at the first target speed of the stepper motor.

16. The method of claim 15, wherein the stall threshold represents a stall boundary.

17. The method of claim 14, further comprising applying a third drive signal to operate the stepper motor at a third target speed that is less than the second target speed in an instance in which the signal indicative of the electric current supplied to the stepper motor during the application of the second drive signal corresponds to the operating condition associated with an increased likelihood of stall at the second target speed of the stepper motor.

18. The method of claim 14, further comprising applying a third drive signal to operate the stepper motor at a third target speed that is greater than the first target speed in an instance in which the signal indicative of the electric current supplied to the stepper motor during the application of the first drive signal corresponds to a reduced load condition on the stepper motor, wherein the signal indicative of the electric current supplied to the stepper motor corresponds to the reduced load condition in an instance in which an amplitude of the electric current supplied to the stepper motor is less than a reduced load threshold during application of the first drive signal.

19. The method of claim 14, further comprising applying a third drive signal to operate the stepper motor at a third target speed that is greater than the second target speed in an instance in which the signal indicative of the electric current supplied to the stepper motor during the application of the second drive signal corresponds to a reduced load condition on the stepper motor, wherein the signal indicative of the electric current supplied to the stepper motor corresponds to the reduced load condition in an instance in which an amplitude of the electric current supplied to the stepper motor is less than a reduced load threshold during application of the second drive signal.

20. A trolling motor steering assembly, comprising:

a stepper motor configured to be coupled to a trolling motor assembly and to rotate a shaft of the trolling motor assembly to a plurality of positions about an axis; and a steering assembly control system, the steering assembly control system comprising:

a processor;

current sensor circuitry for generating a signal indicative of an electric current supplied to the stepper motor; and a memory including program code configured to, when executed, cause the processor to:

receive a steering command;

determine a stepper motor driver setting based on the steering command, wherein the stepper motor driver setting comprises a first target speed of the stepper motor;

apply a first drive signal to operate the stepper motor at the first target speed in accordance with the stepper motor driver setting so as to cause the steering assembly to rotate the trolling motor housing about the first axis in response to the steering command;

receive the signal indicative of the electric current supplied to the stepper motor during the application of the first drive signal; and provide a second drive signal to operate the stepper motor at a second target speed that is less than the first target speed in an instance in which the signal indicative of the electric current supplied to the stepper motor during the application of the first drive signal corresponds to an operating condition associated with an increased likelihood of stall;

wherein the first drive signal comprises a plurality of DC voltage pulses that each represents a discrete, incremental rotation of the stepper motor, wherein the second drive signal is provided by:

decreasing a frequency of the DC voltage pulses of the first drive signal; or increasing a pulse width of the DC voltage pulses of the first drive signal.

* * * * *